US009515492B2

(12) United States Patent
Nomura et al.

(10) Patent No.: US 9,515,492 B2
(45) Date of Patent: Dec. 6, 2016

(54) WIRELESS POWER TRANSFER USING AIR GAP AND METAMATERIAL

(71) Applicant: Toyota Motor Engineering & Manufacturing North America, Inc., Erlanger, KY (US)

(72) Inventors: Tsuyoshi Nomura, Ann Arbor, MI (US); Jae Seung Lee, Ann Arbor, MI (US); Paul Donald Schmalenberg, Ann Arbor, MI (US); Koji Shiozaki, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 546 days.

(21) Appl. No.: 13/706,507

(22) Filed: Dec. 6, 2012

(65) Prior Publication Data

US 2014/0159479 A1    Jun. 12, 2014

(51) Int. Cl.
H02J 17/00    (2006.01)
H02J 5/00    (2016.01)
B60L 11/18    (2006.01)
H01F 38/14    (2006.01)
H01F 27/34    (2006.01)
H02J 7/02    (2016.01)

(52) U.S. Cl.
CPC ............ H02J 5/005 (2013.01); B60L 11/182 (2013.01); H01F 27/346 (2013.01); H01F 38/14 (2013.01); B60L 2270/147 (2013.01); H02J 7/025 (2013.01); Y02T 10/7005 (2013.01); Y02T 10/7072 (2013.01); Y02T 90/122 (2013.01); Y02T 90/14 (2013.01)

(58) Field of Classification Search
CPC ............ H02J 5/005; H02J 7/025; H02J 17/00; H01F 27/346; H01F 38/14; B60L 11/182; B60L 2270/147; Y02T 90/122; Y02T 90/14; Y02T 10/7005
USPC ........................................................ 307/104
See application file for complete search history.

(56) References Cited

U.S. PATENT DOCUMENTS

2010/0117596 A1* 5/2010 Cook et al. .................. 320/108
2010/0244577 A1* 9/2010 Shimokawa ................. 307/104
2011/0133568 A1* 6/2011 Wang et al. ................. 307/104
2011/0266879 A1   11/2011 Kim et al.
2011/0267247 A1   11/2011 Choi et al.

(Continued)

OTHER PUBLICATIONS

Wang, B., Teo, K.H., Nishino, T., Yerazunis, W., Barnwell, J., Zhang, J., "Wireless Power Transfer with Metamaterials," Mitsubishi Electric Research Laboratories, European Conference on Antennas and Propagation (EUCAP) (2011).

Primary Examiner — Thienvu Tran
Assistant Examiner — Kevin J Comber
(74) Attorney, Agent, or Firm — Dinsmore & Shohl LLP

(57) ABSTRACT

Examples of the invention include methods and apparatus for wirelessly transmitting power to a vehicle using electromagnetic radiation. An example apparatus includes a transmitter coil associated with a first metamaterial lens, and a receiver coil associated with a second metamaterial lens, the receiver coil being located within the vehicle. The metamaterial lenses each have a negative magnetic permeability, and are separated by a lens spacing including an air gap. The first and second metamaterial lenses (and the lens spacing) act cooperatively to focus the electromagnetic radiation from the transmitter coil on the receiver coil.

12 Claims, 9 Drawing Sheets

(56) References Cited

U.S. PATENT DOCUMENTS

2012/0153894 A1* 6/2012 Widmer .................. 320/108
2013/0127252 A1* 5/2013 Yerazunis et al. ............ 307/104

* cited by examiner

Effect Distar

WIRELESS POWER TRANSFER USING AIR GAP AND METAMATERIAL

FIELD OF THE INVENTION

The invention relates to wireless power transfer, for example, to a vehicle.

BACKGROUND OF THE INVENTION

Electric vehicles need to be frequently charged, commonly by plugging the vehicle into a wall socket. However, failing to plug the vehicle in may lead to the inconvenient situation where a vehicle is uncharged when needed.

SUMMARY OF THE INVENTION

Examples of the invention include apparatus and method for improved wireless power transfer between a power transmitter (including a transmitter coil) and a power receiver (including a receiver coil) across an air gap. Examples include improved charging apparatus for any type of electric vehicle, such as an electrically powered automobile or in some cases a hybrid vehicle.

A transmitter coil is used to generate an electromagnetic field when energized, and a receiver coil inductively couples to the transmitter coil, allowing wireless power transfer from the transmitter coil to the receiver coil. Electrical signals induced in the receiver coil may then be used to charge a vehicle battery. Conventionally, this approach can be efficient if the coils are very close to one another, but in typical vehicle use this approach may not be sufficiently efficient across the gap between a power transmitter and a power receiver within the vehicle. In examples of the present invention, one or more metamaterial lenses are used to improve the efficiency of wireless power transfer across the gap, such as an air gap between a transmitter located within the ground and a receiver located within the vehicle. The metamaterial lenses are negative materials, having a negative magnetic permeability. Preferably, the magnetic permeability is approximately −1, for example between −0.95 and −1.05. However, examples of the present invention include metamaterial lenses having other negative values for the magnetic permeability. In some examples, the permeability is in the range −0.5 to −1.5, more particularly in the range −0.8 to −1.2.

A metamaterial lens having a refractive index of −1 is known as a perfect lens. Placed between two coils, it may be used to focus transmitted radiation from one coil onto the other. However, in the field of wireless power transfer to an electric vehicle, there is typically an air gap between the transmitting coil located within the ground, and a receiving coil located within the vehicle. Examples of the present invention allow enhanced efficiency power transfer across a gap, and/or the gap to be significantly increased, compared to a configuration where only a single metamaterial lens is placed near the midpoint between the two coils.

In some examples, a pair of negative permeability metamaterial lenses are configured so that an air gap therebetween acts in a similar manner to a perfect lens. The apparent focusing effect of the air gap between negative index metamaterial lenses allows the air gap to be increased, without a conventionally corresponding reduction in power transfer efficiency.

The metamaterial lenses may be truncated in the horizontal direction, i.e. parallel to the plane of the coils, without significant loss of efficiency. For example, a lens may be a disk or cuboid shape having a diameter or width (e.g. in the horizontal or lens plane) of at least 30 centimeters, and in some examples between 30 centimeters and 2 meters.

The metamaterial lens may also be truncated in the perpendicular direction, along an axis joining the transmit and receiver coils, and this truncation may be increased by placing the metamaterial lenses between two mirrors. Ideally, the mirrors may act as magnetic mirrors, but in practice electrical mirrors, such as electrical conducting sheets, may be used.

Examples of the present invention include a vehicle having a receiver coil, a metamaterial lens having a negative permeability, and optionally a mirror. The metamaterial lens and the receiver coil may be placed between the mirror and the road surface. There are various configurations of the metamaterial lens and the receiver coil that may be used. The receiver coil may be located within the metamaterial lens, for example approximately at the midpoint, or located on the lower surface of the metamaterial lens. The mirror may be disposed above, and in some examples adjacent to, the metamaterial lens.

For example, in a first configuration, a receiving apparatus for receiving wireless power transfer includes a receiver coil, a mirror, and a metamaterial lens having a negative permeability. The mirror is located above the metamaterial lens, and the receiver coil may be located adjacent and below the mirror, within the metamaterial lens, or in some cases below the metamaterial lens.

An electric charging apparatus for a vehicle, such as an electric vehicle, includes a transmitter coil, a receiver coil, a first metamaterial lens, a second metamaterial lens, and optionally first and second electromagnetic mirrors. For example the mirrors and metamaterial lenses may be configured to define a resonator type arrangement, the metamaterial lenses being adjacent the mirrors and defining an air gap therebetween. Sequentially, the arrangement may be a mirror, a metamaterial lens, an air gap, a second metamaterial lens, and a second mirror. A first coil is associated with the first metamaterial lens and a second coil is associated with the second metamaterial lens. The mirrors and metamaterial lenses are configured to enhance the efficiency of wireless power transfer between the first and second coils.

An example apparatus for wirelessly charging a vehicle includes two sets of components, namely a power transmitter and a power receiver, each set having an induction coil, a metamaterial lens having a negative refraction index and a mirror, such as a metamaterial mirror or metal sheet. These components are arranged in a sandwich-type manner where the mirrors are the outermost component. Disposed within the mirrors are the coils and the metamaterial lenses, a substantial gap existing between the sets of components. This arrangement allows a magnetic flux produced by the power transmitter, generated by a transmitter coil, to be wirelessly transmitted to the power receiver across the gap. The arrangement improves efficiency in the wireless power transfer, and enables a greater power transmission distance between the component sets.

Examples include a wireless power transfer apparatus comprising a pair of coils, a pair focusing metamaterial lenses, and a pair of metamaterial mirrors, arranged in a manner which largely contains the magnetic flux of the system between the mirrors.

DETAILED DESCRIPTION OF THE INVENTION

Examples of the present invention include methods and apparatus for improving wireless power transfer between a pair of coils. A metamaterial lens is a composite material including, typically, a repeating unit cell structure including a conducting pattern and a dielectric support material. For example, the conducting pattern may be an electrically conducting resonator formed by a coil of wire, or conducting pattern printed on a circuit board. As is known in the metamaterial arts, the metamaterial can be configured to have a negative permeability, for example, using a resonant structure such as a copper loop. The negative permeability allows refocusing of a transmitted magnetic field in the manner of a lens, even for a planar surface. The focusing effect of a negative index lens is known, and such a configuration may be termed a perfect lens or a super-lens.

Figure 1:
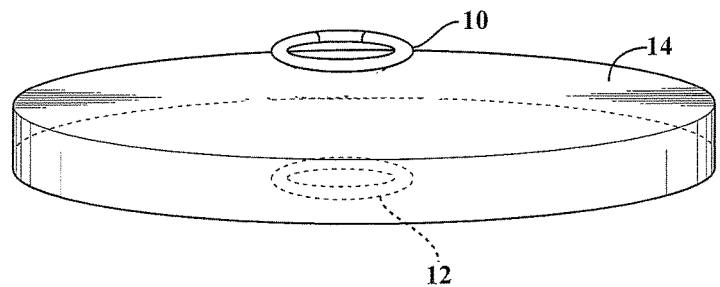
FIG. 1 shows a metamaterial lens located between two coils, denoted a transmitter coil and a receiver coil.

FIG. 1 shows a metamaterial lens 14 located between a receiver coil 10 and a transmitter coil 12. In this arrangement, the metamaterial lens 14 is a disk. Such a configuration may be used to focus the transmitted electromagnetic radiation from the transmitter coil to the receiver coil. However, this configuration is not always useful, for example where a substantial air gap exists between the transmitter and receiver coil. In some cases a metamaterial lens may be physically introduced into the air gap; however, examples of the present invention allow an increased air gap to be maintained, while retaining an efficient transfer of power.

Figure 2:
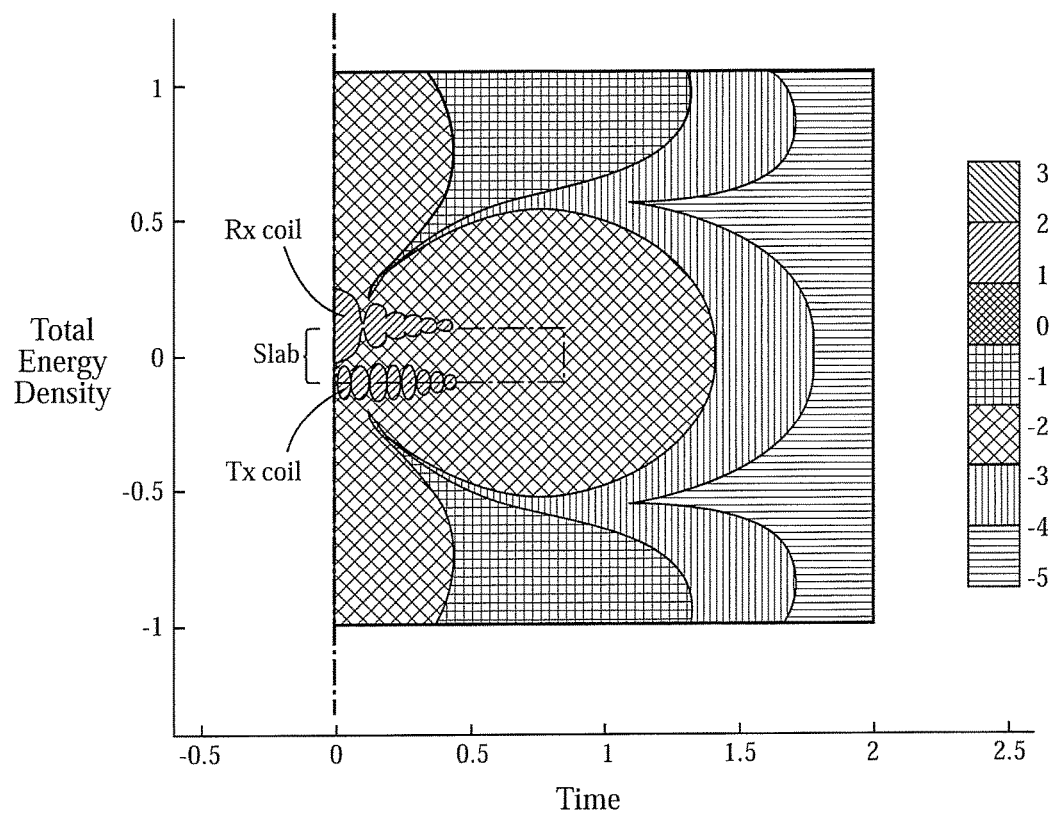
FIG. 2 shows the field distribution for an arrangement such as that shown in FIG. 1.

FIG. 2 is a side-view magnetic field distribution simulation for the configuration shown in FIG. 1, showing the relative locations of the transmitter coil, receiver coil, and metamaterial lens. The electromagnetic simulations assumed a frequency of 1 MHz, a lens radius of 0.85 m, a lens thickness of 0.2 m, a coil radius of 0.1 m, and a coil-to-coil distance of 0.4 m. The simulated system had axial symmetry and the analysis plane is a side-view. This figure illustrates the focusing effect of the negative index metamaterial lens. However, while inserting the metamaterial lens increases the efficiency of the power transfer, it does not allow an increase in the ground-to-vehicle distance, where one coil is in the ground and the other coil is within the vehicle.

In examples of the present invention, a pair of negative index materials are configured so that the air gap between the two metamaterial lenses acts as a super-lens, or perfect lens.

A super-lens effect is associated conventionally with a negative refractive index. However, more generally a super-lens effect may be obtained using a slab-like lens with a refractive index of opposite sign to the surrounding medium. In examples of the present invention, the air slab is effectively surrounded by a negative refractive index medium, provided by the metamaterials. In this configuration, the air slab or air gap between the pair of metamaterial lenses acts as a super-lens, or perfect lens. For practical applications, the air slab may be truncated in the horizontal direction, because the transmitted electromagnetic field tends to decay in the horizontal direction with the distance from the transmitter coil. Similarly, the negative refractive index slabs may be truncated in the vertical direction, and in some examples a mirror introduced to reduce the effects of truncation. As a result, an air gap can be defined between two negative refractive index metamaterial lenses. Using this configuration, an air gap of twice a conventional air gap may be used, while retaining the same transmission efficiency.

Figure 3A:
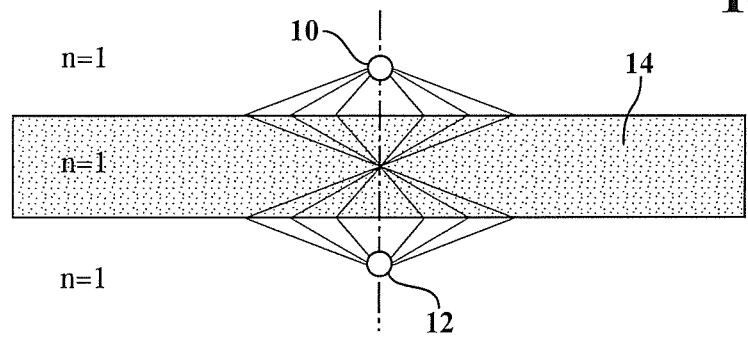
FIG. 3A is a simplified schematic illustrating the configuration of FIG. 1.

FIG. 3A shows conventional super-lensing effects between first and second coils 10 and 12 by placing a negative refractive index slab between them. This is the configuration of FIG. 1. Here, the receive and transmitter coils are represented by single points, as transmit and receive wires. This is just for illustrative and simulation efficiency and does not affect the operation of the invention.

Figure 3B:
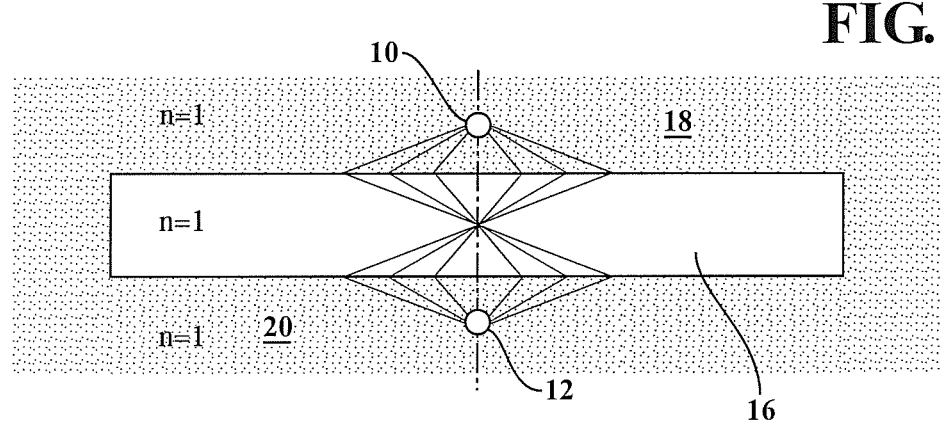
FIG. 3B shows a configuration useful for enhancing the power transfer across an air gap, where a region of unity refractive index, such as air, is bounded by regions of negative refractive index.

FIG. 3B shows a highly useful configuration for the wireless transmission of power across an air gap. Here a unity refractive index region, of n=1, is generally surrounded by negative refractive index media, having n=−1. The negative refractive index regions may, as discussed later, be provided by negative index metamaterials. The positive refractive index lens may, as discussed later, be provided by an air gap between the metamaterial lenses. Due to the focusing effect within the air gap, the air gap may be doubled in thickness compared with that possible using the configuration of FIG. 3A. For example, in FIG. 3A the maximum possible air gap for this configuration of power transfer is that between the upper surface of lens 14 and the receiver coil 10. However, in FIG. 3B the maximum thickness air gap is that available between the lower surface of negative refractive index region 18 and the upper surface of negative refractive index region 20. As shown, this allows the available air gap to be doubled.

Figure 4A:
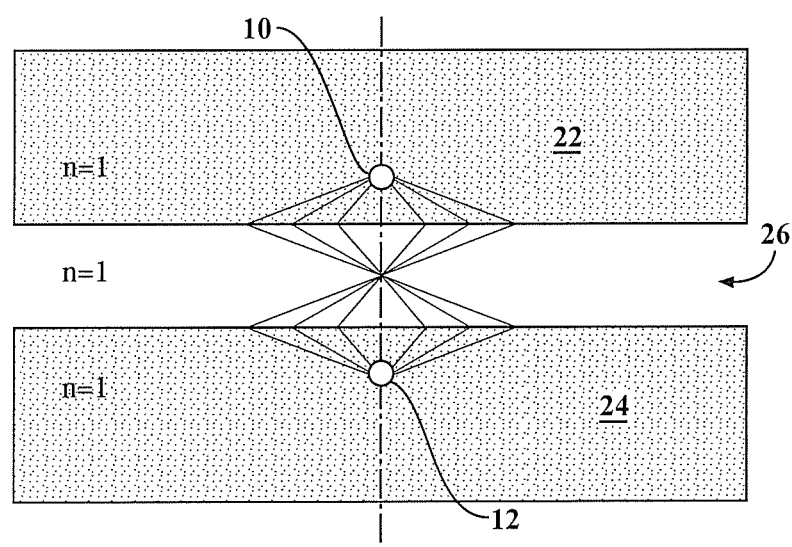
FIG. 4A illustrates truncation of the negative index materials in a horizontal direction, defining an air gap therebetween.

FIG. 4A shows truncation of the negative index materials. As previously remarked, the horizontal truncation can be chosen based on the field distribution from the transmitter coil as it reaches the interface between the lower metamaterial lens 24 and the air gap above it. Truncation may slightly reduce efficiency, but is practically necessary. Truncating the region defines a width or diameter for the negative metamaterial lenses at 22 and 24.

Figure 4B:
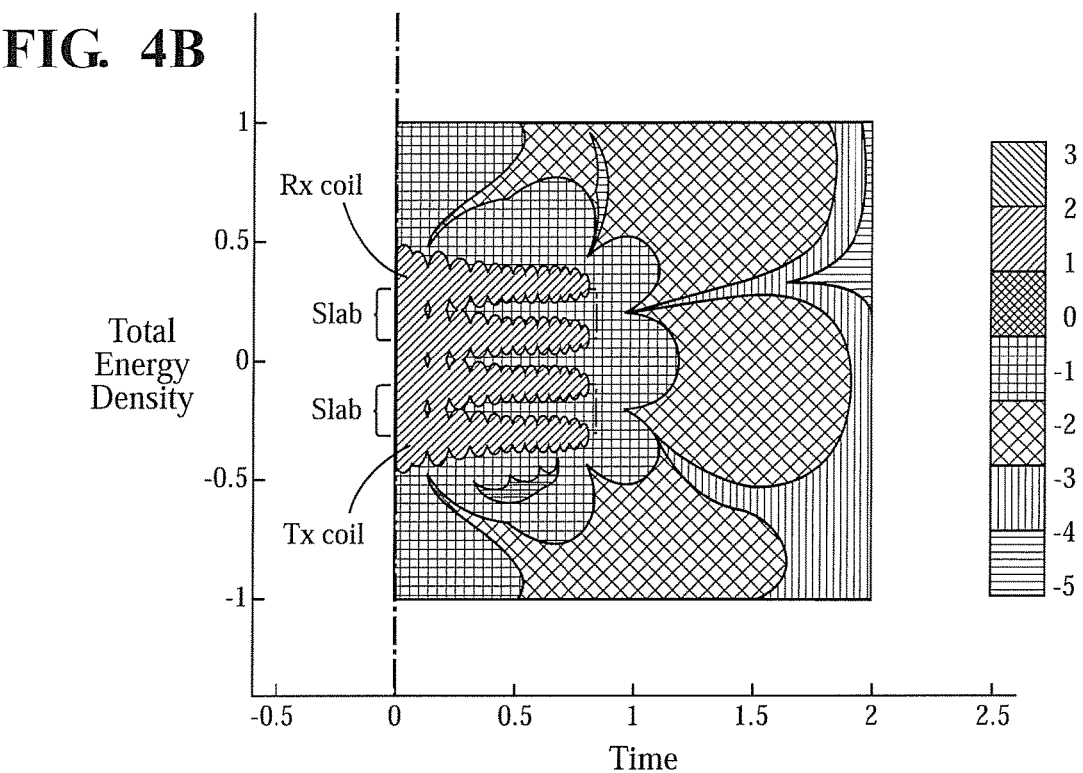
FIGS. 4B-4C show electromagnetic simulations.
Figure 4C:
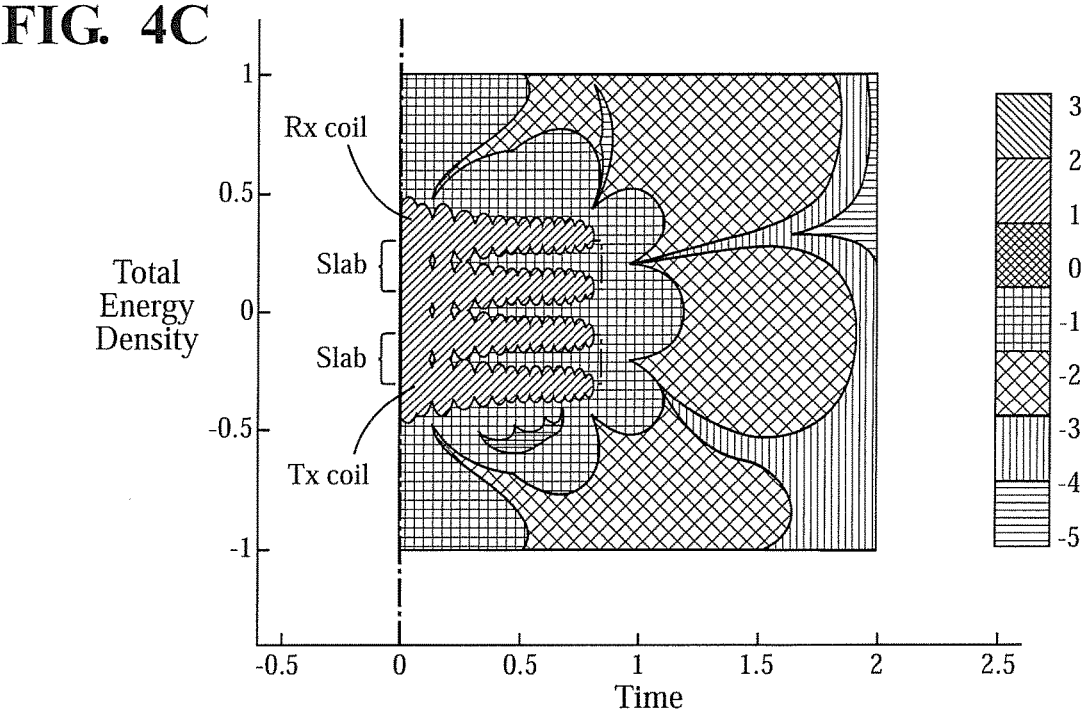

FIGS. 4B-4C show electromagnetic simulations of two negative index metamaterial lenses, with an air gap therebetween, and transmitter and receiver coils.

Figure 5A:
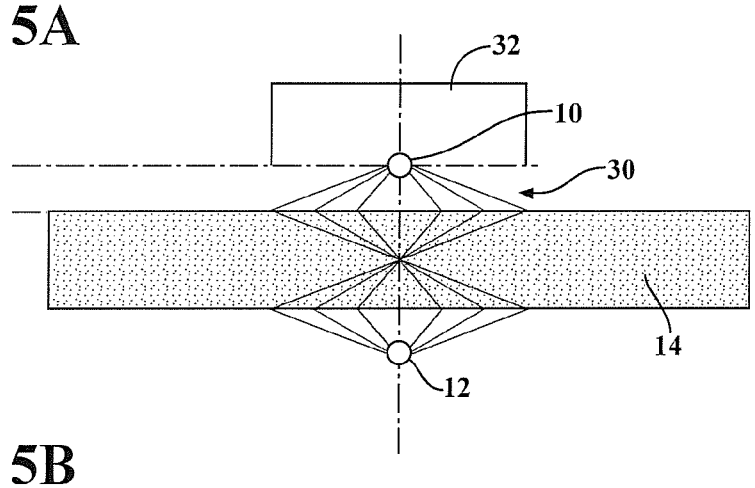
FIGS. 5A and 5B show how the effective distance between transmitter and receiver coils may be increased for a given transmission efficiency using negative index metamaterials.
Figure 5B:
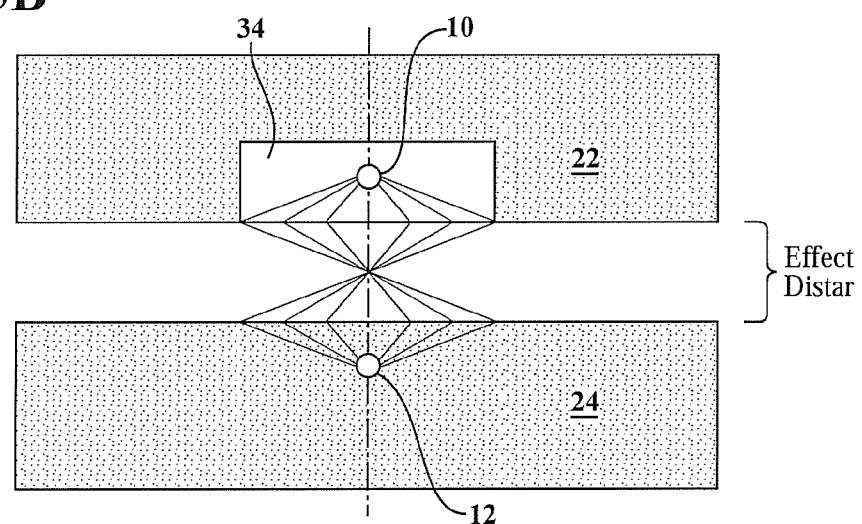

FIGS. 5A-5B is a further illustration of the increase in available air gap. FIG. 5A shows the configuration of FIG. 3A applied to a vehicle 32 supported on a ground surface, the ground surface being concurrent with the upper surface of a negative metamaterial lens 14 as shown in FIG. 3A. In this example, the transmitter coil 12 is embedded within the ground and radiation transmitted by this coil is focused by the negative index lens 14 and then incident on the receiver coil 10 located within the vehicle 32. The maximum air gap, labeled effective distance, is that between the underside of the vehicle and the ground surface.

FIG. 5B shows how the use of the air gap as a super-lens, as illustrated in FIG. 3B and FIG. 4A, allows the air gap to be doubled while retaining the transmission efficiency. In this case, the transmitter coil 12 is located within a negative refractive index medium 24, as shown in FIG. 4, and the receiver coil on the vehicle 34 is similarly located within a negative refractive index medium 22. The effective distance is the thickness of the air gap, and this is double that shown in FIG. 3A.

As shown in FIG. 4A, the negative refractive index lens extends in an undefined direction and distance in the vertical direction. For practical applications, it will be useful to truncate the negative refraction domain to use a metamaterial lens of practically applicable thickness. As long as the thickness is large enough to avoid coupling of surface waves on both sides, the lens may be truncated to this thickness. However the minimum required thickness can be determined and configured as described below. The super-lens of air creates a perfect image across the lens, and by stacking two super-lenses also creates another perfect image across the second lens. At the same time, the lens creates a focus point in the middle of the super-lens. Therefore, it is possible to use these focus points for transmission and reception. Hence, using these points, the thickness of the negative refractive index metamaterial lens can be truncated to be approximately the same thickness as the air gap. This configuration maintains surface wave resonance, which is observed in a normal super-lens configuration where lens thickness and air gap thickness are maintained.

Figure 6A:
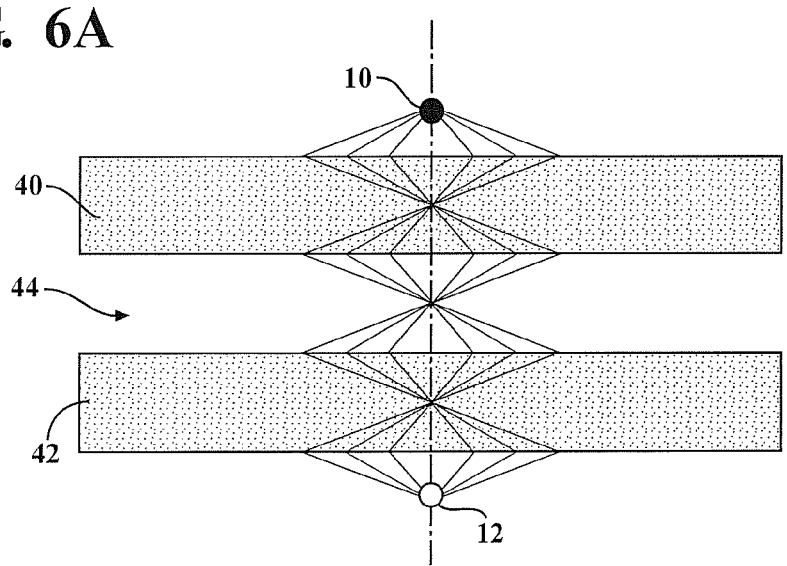
FIG. 6A shows a configuration using first and second metamaterial lenses defining an air gap between them.
Figure 6B:
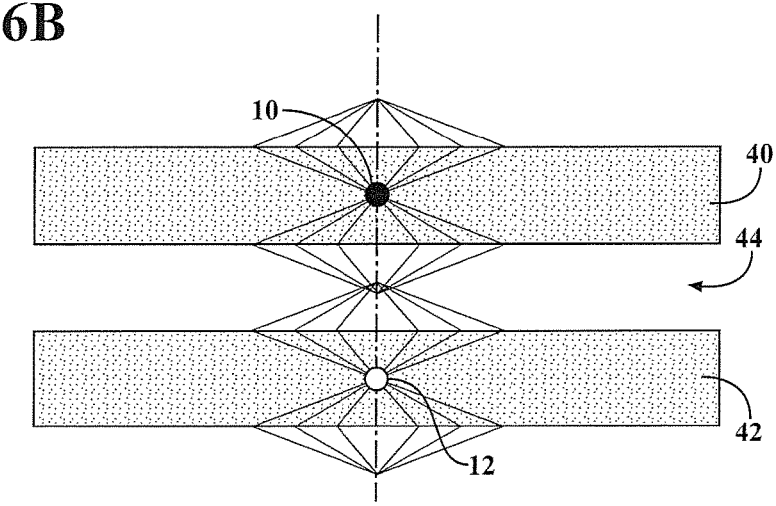
FIG. 6B is similar to FIG. 6A, the transmit and receive wires being located within the metamaterial lenses.

FIGS. 6A-6B show a representative configuration. Receive and transmit wires are shown for illustrative simplicity, and correspond to the receiver and transmitter coils, 10 and 12 respectively, of FIG. 1. The two negative index metamaterials 40 and 42 define the air gap 44 therebetween. The transmit and receive wires are located at focal points of the metamaterial lenses 40 and 42, and by configuring the air gap to have a similar thickness to each metamaterial lens, focusing is obtained across the air gap.

However, as shown in FIG. 6A there are focal points obtained within the metamaterial lenses themselves. In some configurations, the transmit and receive wires may be located within the metamaterial lenses at the focal points. In the configuration of FIG. 6B, the distance between the transmit wire and the upper surface of lens 42 is approximately half the thickness of the air gap 44. Similarly, the distance between the receive wire and the lower surface of lens 40 is also approximately half the thickness of the air gap 44. As the lenses 40 and 42 have a thickness similar to the air gap, this means that the transmit and receive wires are approximately at the midpoints of the two lenses.

Examples of the present invention also include cascades of two or more metamaterial lenses, allowing wireless power transfer over large distances. However, the maximum available air gap is not increased by this approach.

Figure 7A:
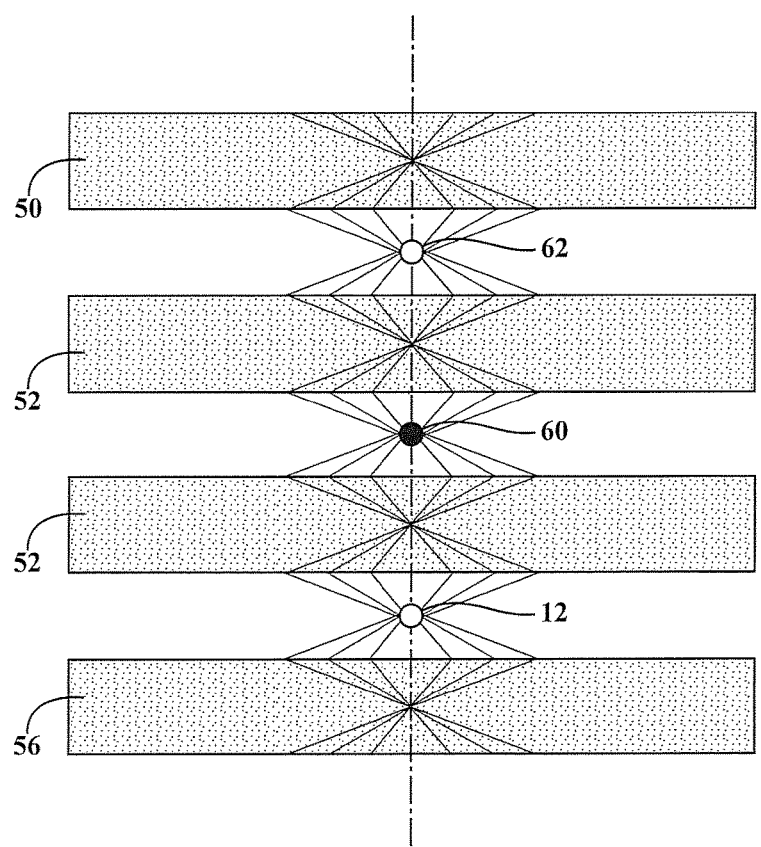
FIG. 7A shows a cascading configuration, in which a linear array of negative index metamaterial lenses may be used to transmit wireless power over a large distance.

FIG. 7A shows a configuration including metamaterial lenses 50, 52, 54, 56. A transmitter coil at, for example, point 12 creates a series of focus points at the midpoints of the metamaterial lenses and also at the midpoint of the air gaps between them. Hence a receiver coil may be located at position 60, position 62, or any equivalent position within the air gap.

Figure 7B:
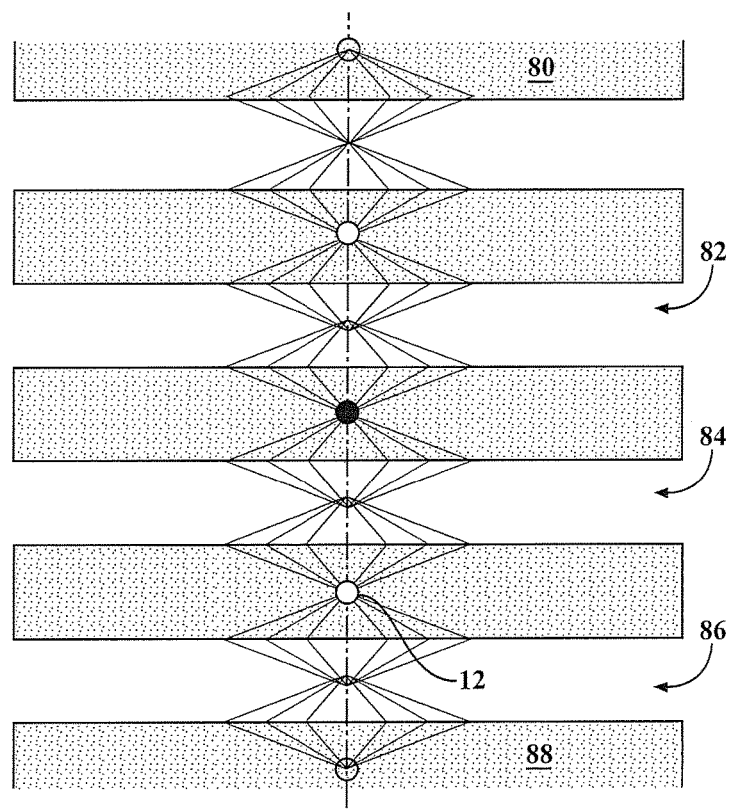
FIG. 7B shows a second cascading configuration, in which the transmit and receive wires are located within the metamaterial lenses.

FIG. 7B shows a similar configuration, only in this case the transmitter coil 12 is located within a metamaterial lens and a receiver coil is located, for example at positions 90, 92 or similar. In this example, the metamaterial lenses are shown at 80, 82, 84, 86, and 88.

Figure 7C:
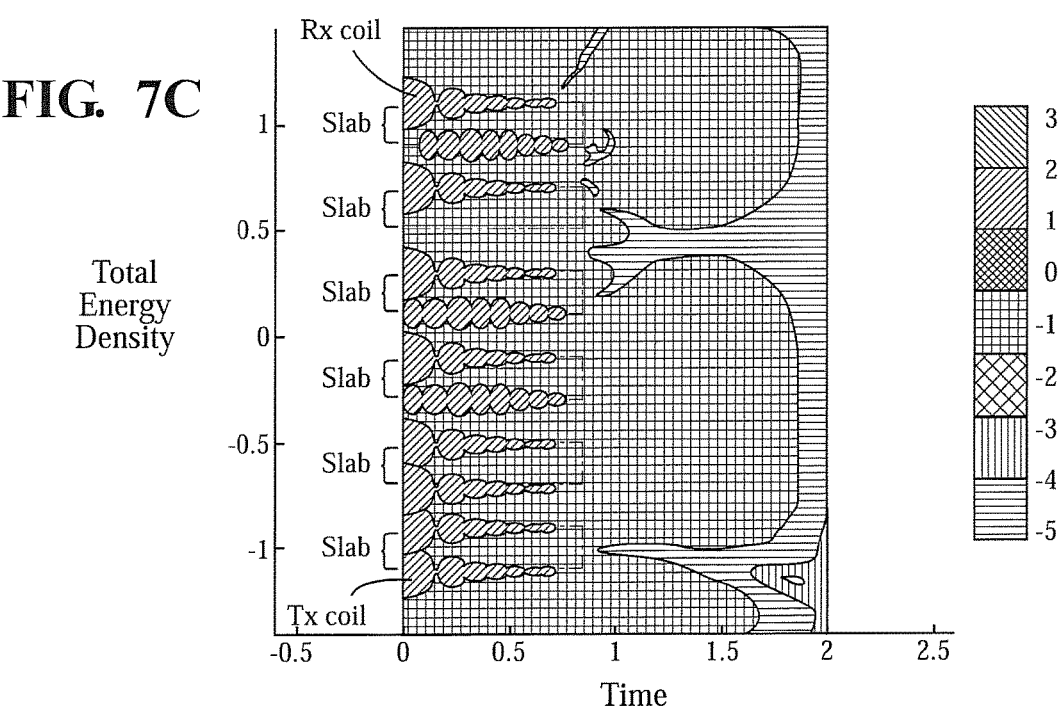
FIG. 7C shows an electromagnetic simulation of the cascading configuration.

FIG. 7C shows an electromagnetic simulation of the cascading configuration.

In theory, an infinite cascade can be configured, by locating effective transmitter and effective receiver points alternatively in the middle of either the air gap or a metamaterial lens. Energy transfer is maximized, because the source energy of each effective transmitter point is focused at the corresponding focus point of the lens, which then acts as an effective transmitter point for the next lens. In the infinite cascade, the perfect lens may be the metamaterial lens, or the air gaps therebetween. For example in FIG. 7A, the metamaterial lens 54 acts as a perfect lens, focusing the radiation to a point 60, which then acts as an effective transmitter for perfect lens 52, focusing the radiation at point 62, then acting as a transmitter point for lens 50. This cascaded transmission may include any number of perfect lenses, for example between two and twenty. Cumulative losses may limit the maximum number of metamaterial lenses that may be used.

Figure 8A:
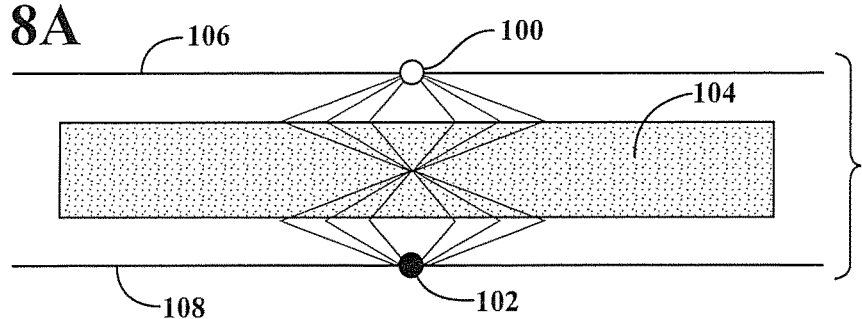
FIG. 8A shows a unit cell structure of the configuration of FIG. 7A, in which truncation using a mirror is possible.

In FIGS. 7A and 7B, horizontal lines are drawn through the midpoint of each perfect lens. The location of a mirror along the indicated horizontal lines allows a cascade to be truncated at that point. For example, FIG. 8A shows a transmitter 102, receiver 100, and perfect lens 104, with mirrors 106 and 108 extending proximate the transmitter and receiver. This configuration is effectively the unit cell structure of the infinite cascade shown in FIG. 7A, with the mirrors allowing truncation at the top and bottom. For example, referring back to FIG. 7A, a mirror extending through location 62 shown at 58 would allow the cascade to be truncated at that point, with 62 being used as the location of a receiver coil.

Figure 8B:
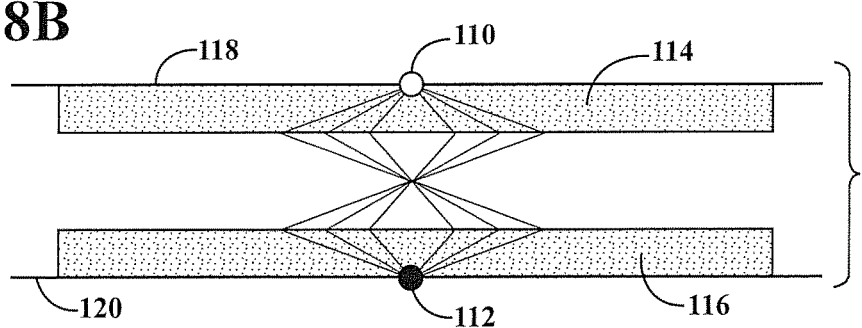
FIG. 8B shows the unit cell of the configuration of FIG. 7B, also allowing truncation using a mirror.

FIG. 8B similarly shows the unit cell of FIG. 7B, with a mirror extending through the midpoint of metamaterial lenses 114 and 116. In this case, the metamaterial lenses are each approximately half the thickness of the air gap between them. The mirrors 120 and 118 are, in theory, preferably magnetic mirrors. However, the use of magnetic conductors is not necessary to practical applications, as these may be replaced with electric conductors. FIGS. 8A and 8B show valuable configurations for power transfer between a receiver coil and a transmitter coil. The configuration of 8B is useful, in that the air gap is maximized between the two metamaterial lenses 114 and 116, and further in that the metamaterial lenses may be half the thickness of those shown in FIG. 6B, for example, due to the truncation effect of the mirrors.

Figure 9A:
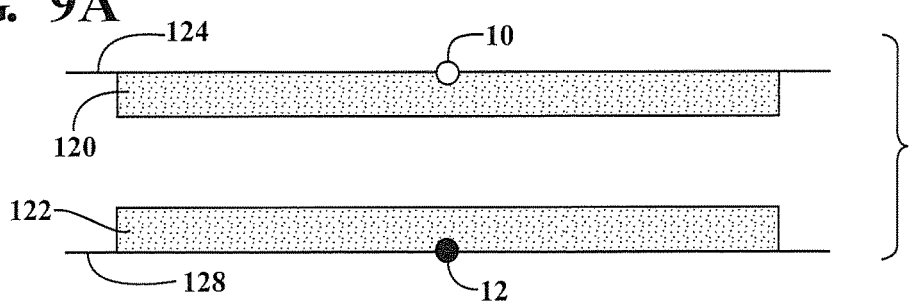
FIGS. 9A-9D illustrate configurations for improved wireless power transfer, including an arrangement of first and second metamaterial lenses, first and second coils in the form of a transmitter coil and a receiver coil, and optionally first and second mirrors, the metamaterial lenses and transmit and receiver coils being located between the mirrors.
Figure 9B:
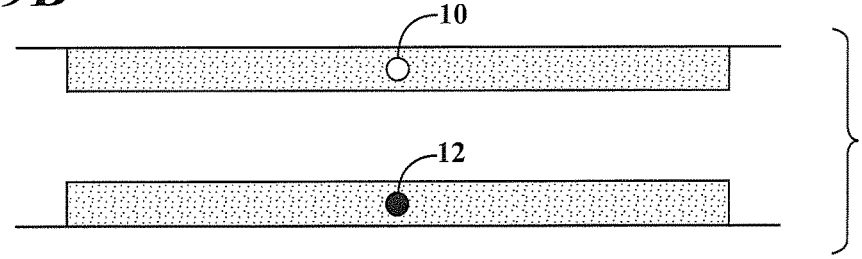

However, it is not necessary that the transmit and receiver coils are adjacent the mirrors as shown in FIG. 8B. FIGS. 9A-9D show alternative configurations for the location of the transmitter coil 12 and the receiver coil 10. FIG. 9A is similar to that shown in FIG. 8B, with the transmit and receiver coils (12 and 10, respectively) being approximately the same level as the adjacent mirrors 124 and 126. The metamaterial lenses at 120 and 122 are preferably negative index metamaterials, but for low frequency power transfer only the magnetic component may be necessary to make negative. For example a metamaterial may have a negative permeability, preferably −1 but at least negative, whereas the electric permittivity may be positive and in some examples may be approximately 1 to reduce losses at the interface between the metamaterial and the air gap. FIG. 9B shows the transmit and receiver coils located near the center of each metamaterial lens.

Figure 9C:
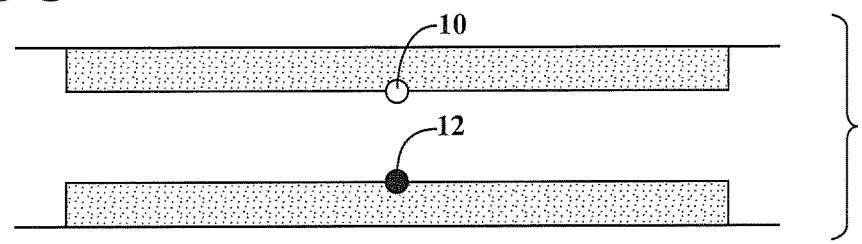
Figure 9D:
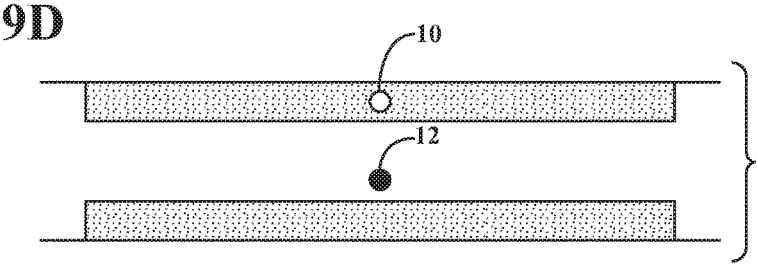

FIG. 9C shows the transmit and receive coils located facing each other across the air gap. FIG. 9D shows that it is possible to use transmit and receive coils in non-symmetric configurations, in this case using a receive coil within the metamaterial lens 120, and a transmit coil located slightly above the metamaterial lens 122.

An additional benefit of the use of mirrors is electromagnetic shielding of the vehicle and its occupants. An electromagnetic mirror may serve the dual function of protecting the vehicle passenger compartment from transmitted electromagnetic radiation, and also increase the rate of power transfer to the vehicle.

Figure 10:
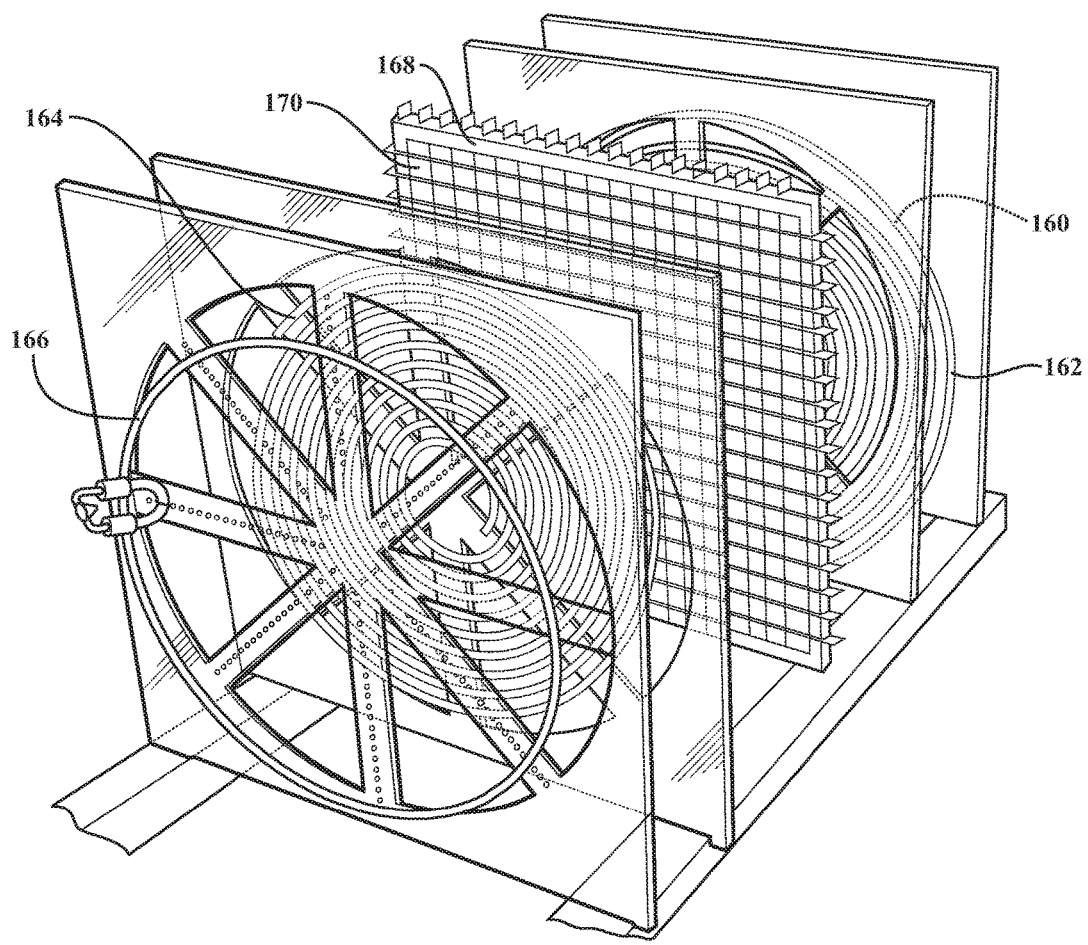
FIG. 10 shows an experimental arrangement, using a metamaterial lens, transmitter coil, and receiver coil.

FIG. 10 shows an experimental configuration, illustrating a single metamaterial lens located between a transmitter coil assembly and a receiver coil assembly. This figure shows a transmitter coil 162 inductively energized by energizing coil 160, the energizing coil being used for better impedance matching to the power transmitter circuit (not shown). Similarly the receiver coil assembly includes a receiver coil 164 inductively coupled to a second receiver coil 166, for impedance matching to the receiver electronic circuit (not shown). In this example, the metamaterial lens 168 is provided by a cubic array of printed circuit boards. Each face of the cube is used to support a resonator 170, such as a split ring resonator (as shown at 170) or other resonator structure.

Resonators, such as the resonator 170, are typically sized so that the unit cell dimension of the metamaterial is less than the operating electromagnetic wavelength, for example one fifth the wavelength or less.

For wireless transfer for frequencies up to 1 megahertz, such as 100 kilohertz, it is not necessary that the electric permittivity is negative and in a preferred example, the permittivity may be approximately unity (∼1) at the operating frequency to reduce reflection losses at the interface.

Figure 11:
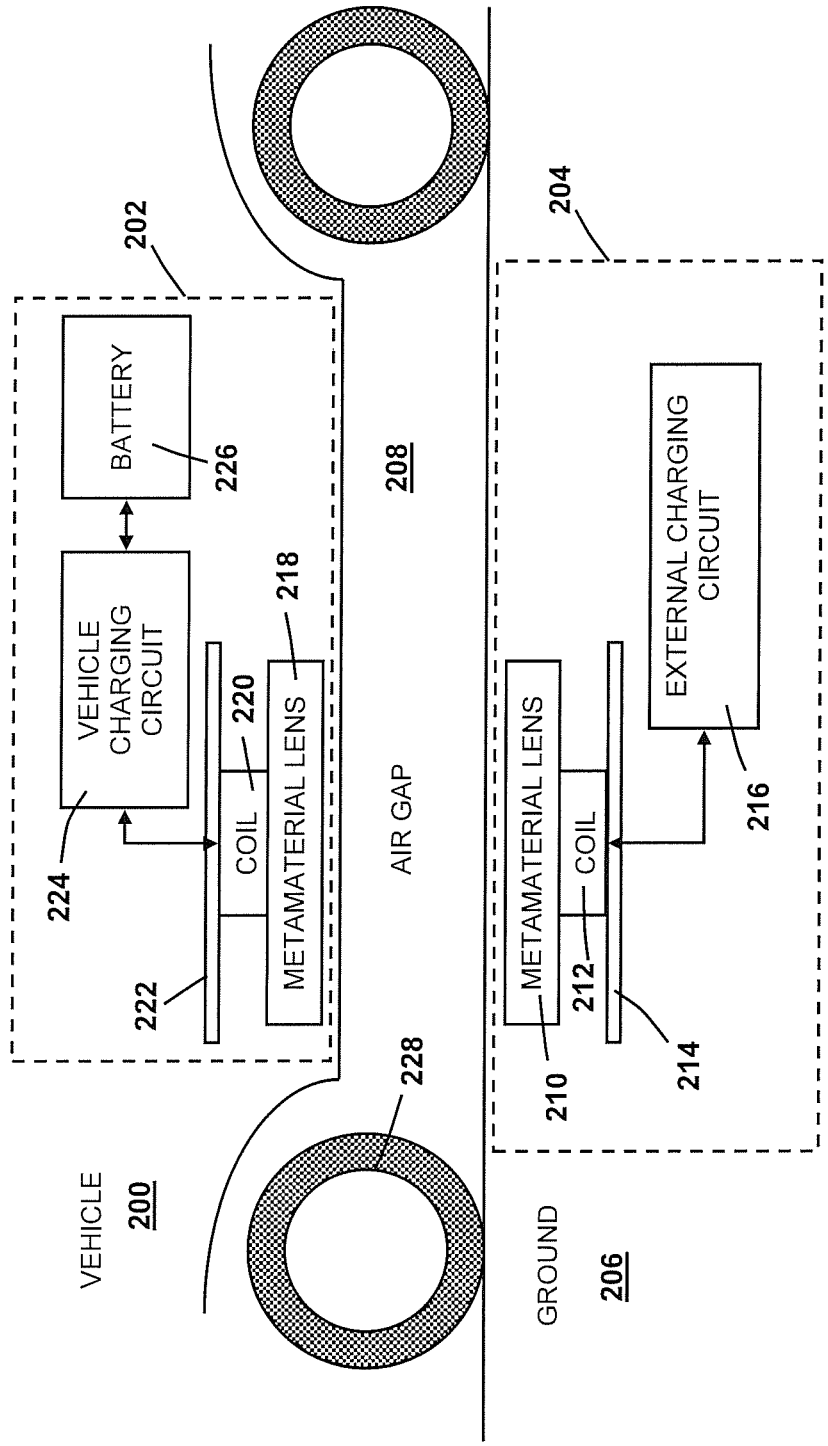
FIG. 11 shows a schematic arrangement for a power transmitter and a power receiver.

FIG. 11 shows an example apparatus, including a power receiver 202 located within a vehicle 200 and configured for wirelessly receiving electrical power, and a power transmitter 204 located within the ground 206 beneath the vehicle 200. An air gap 208 separates the underside of the vehicle 200 and the ground surface, related to the configuration of the vehicle and its wheels 228.

The power transmitter 204 includes a transmitter coil 212, a metamaterial lens 210, the metamaterial lens being a metamaterial lens having negative magnetic permeability at the operating frequency, and a mirror 214 that reflects the electromagnetic radiation used in the wireless power transfer and may provide some degree of electromagnetic shielding. The power transmitter also includes an external charging circuit 216, receiving external power (e.g., mains electricity, not shown), and operable to energize the transmitter coil 212.

The power receiver 202 includes a metamaterial lens 218, the metamaterial lens being a metamaterial lens having negative magnetic permeability, a receiver coil 220, and a mirror 222 that has the dual functionality of reflecting the electromagnetic radiation used in the wireless power transfer and providing electromagnetic shielding for vehicle occupants. The power receiver also includes an electronic circuit (here, including the vehicle charging circuit 224) for conditioning the received signal and charging the battery 226.

A vehicle charging circuit may include a rectifier, a voltage modifier, and a control circuit that controls the charging rate of the battery. A power receiver may also include a second receiver coil, which may provide impedance matching, A mirror may be a planar electrically conducting sheet, such as a metal sheet, having first and second faces, the metamaterial and the coil both being on the first side of the sheet. In the power receiver located in a vehicle, the mirror may provide a conducting barrier located between the metamaterial lens (and associated coil) and the vehicle passenger compartment.

An example power transmitting apparatus for charging a vehicle may be located below a driving surface such as a road, garage, parking space, and the like, or within a wall or other structure that a vehicle may park near. An external charging circuit, such as shown at 216 FIG. 11, may be located in the ground and close to the transmitter coil, or in other examples, the external charging circuit may be located in any convenient location and electrically connected to the transmitter coil by a cable.

An example power transmitting apparatus comprises a power input (configured to receive electrical power, for example from mains electric, solar cell, or other power source), electric converter (to convert the electrical power into alternating current if the power input is direct current), oscillator, optional impedance matching coil, transmitter coil, a metamaterial lens, and an optional mirror. The oscillator may operate at a frequency in the range 10 Hz-10 MHz, such as 1 kHz-1 MHz, but these frequencies are not limiting. The apparatus may be enclosed in a housing having a non-electrically-conducting surface from which the electromagnetic radiation emerges when the transmitter coil is energized. The transmitter coil may be energized by an inductive coupling to an impedance matching coil, electrically connected to the oscillator. The power transmitter may include a vehicle sensor, so as to energize the transmitter coil when a vehicle is located proximate the vehicle sensor. The power transmitter may include a vehicle identifier, operable to read a vehicle identity, for example by detecting a signal from a vehicle transponder.

The power transmitter may include a communications module, for example a wireless receiver or transceiver, operable to receive one or more of the following data from a wireless receiver or transceiver on the vehicle: vehicle identity, vehicle charge status, vehicle type, battery type, and payment information. The power transceiver may include an electronic circuit operable to measure the following parameters related to the charging process: vehicle parking duration, vehicle charging duration, delivered power or charge, power delivered versus time, or other electrical parameter(s).

A method of transmitting wireless power to a vehicle includes energizing a transmitter coil, so that the transmitter coil generates electromagnetic radiation, and passing the electromagnetic radiation through a first metamaterial lens. The first metamaterial lens is, for example, proximate the transmitter coil. The electromagnetic radiation then is transmitted across an air gap and is receiver by a power receiver, including a receiver coil, a second metamaterial lens, and optionally an electromagnetic mirror. The electromagnetic radiation is focused on the receiver coil by the action of the second metamaterial lens, optionally in cooperation with the electromagnetic mirror if present. Preferably, the first and second metamaterial lenses each have a negative magnetic permeability, such as −1 or approximately −1, the air gap being located between the first and second metamaterial lenses. The electromagnetic radiation is received using the receiver coil within the vehicle, whereby wireless power is transmitted to the vehicle, the first and second metamaterial lenses (and the lens spacing including the air gap, and electromagnetic mirrors if present) being configured so that the electromagnetic radiation from the transmitter coil is focused on the receiver coil.

The invention is not restricted to the illustrative examples described above. Examples described are not intended to limit the scope of the invention. Changes therein, other combinations of elements, and other uses will occur to those skilled in the art.

Having described our invention, we claim:

1. An apparatus for transmitting power to a vehicle, the apparatus comprising:
    a power transmitter, including a transmitter coil and a first metamaterial lens, the power transmitter further including a first electromagnetic mirror; and
    a power receiver, including a receiver coil and a second metamaterial lens, the power receiver further including a second electromagnetic mirror, the power receiver being located within the vehicle, the transmitter coil, receiver coil, first metamaterial lens, and the second metamaterial lens being located between the first electromagnetic mirror and the second electromagnetic mirror,
    the first and second metamaterial lenses each having a negative magnetic permeability,
    the apparatus being operable to transmit electromagnetic radiation from the transmitter coil to the receiver coil when the transmitter coil is energized,
    the first metamaterial lens configured to transmit electromagnetic radiation from the transmitter coil onto a focus point, the focus point disposed equidistant between the first and second metamaterial lenses, the electromagnetic radiation transmitting from the focus point so as to be received by the receiver coil.

2. The apparatus of claim 1, the transmitter coil being located within a support surface for the vehicle.

3. The apparatus of claim 1, the power transmitter including an oscillator, the transmitter coil transmitting the electromagnetic radiation when the oscillator is energized.

4. The apparatus of claim 1, the second electromagnetic mirror being located to shield the passenger compartment from the transmitted electromagnetic radiation.

5. The apparatus of claim 1, the negative magnetic permeability of the first and second metamaterial lenses each being −1, or approximately −1.

6. The apparatus of claim 1, the second metamaterial lens being disk shaped, the receiver coil being a circular receiver coil having a receiver coil radius, the second metamaterial lens having a radius of at least double the receiver coil radius.

7. The apparatus of claim 6, the radius of the second metamaterial lens being between 0.5 meters and 2 meters.

8. An apparatus for allowing a vehicle to receive transmitted power wirelessly from a power transmitter, the transmitted power being electromagnetic radiation, the apparatus being located in the vehicle, the vehicle including a passenger compartment; the apparatus including:
    a metamaterial lens, the metamaterial lens having a negative magnetic permeability for the electromagnetic radiation;
    a receiver coil; and
    a pair of electromagnetic mirrors disposed on opposite ends of the metamaterial lenses and on a plane perpendicular to the axis of transmission,
    one of the pair of electromagnetic mirrors being located between the receiver coil and the passenger compartment of the vehicle, the electromagnetic mirror protecting the passenger compartment from the electromagnetic radiation and increasing the rate of transmitted power transfer to the receiver coil, wherein the metamaterial lens is configured to transmit the electromagnetic radiation to a focus point disposed equidistant between the pair of mirrors, the electromagnetic radiation transmitting from the focus point so as to be received by the receiver coil.

9. The apparatus of claim 8, the vehicle including a battery,
    the power receiver further including an electrical circuit configured to charge the battery when the transmitted power is received by the receiver coil.

10. An apparatus for transmitting power to a vehicle using electromagnetic radiation, the vehicle including a receiver metamaterial lens and a receiver coil, the apparatus comprising:
    a power transmitter, the power transmitter including a transmitter coil and a transmitter metamaterial lens, the power transmitter being located outside of the vehicle,
    the transmitter coil transmitting power to the vehicle when the transmitter coil is energized and the vehicle is located proximate the power transmitter,
    an electromagnetic mirror, located beneath the transmitter coil and the transmitter metamaterial lens when the vehicle is located above the transmitter coil and the transmitter metamaterial lens,
    the electromagnetic radiation being transmitted across an air gap between the transmitter metamaterial lens and the vehicle,
    the transmitter metamaterial lens having a negative magnetic permeability for the electromagnetic radiation,
    the electromagnetic radiation transmitted by transmitter metamaterial lens being focused on to a focus point disposed equidistant between the transmitter metamaterial lens and the receiver metamaterial lens, the electromagnetic radiation transmitting from the focus point so as to be received by the receiver coil within the vehicle by the combined action of the transmitter metamaterial lens and the receiver metamaterial lens.

11. The apparatus of claim 10, the negative magnetic permeability of the transmitter metamaterial lens is approximately −1.

12. The apparatus of claim 10, the transmitter coil being located within a parking space for the vehicle.

* * * * *